March 10, 1959 I. M. ROSS 2,877,358

SEMICONDUCTIVE PULSE TRANSLATOR

Filed June 20, 1955

3 Sheets-Sheet 1

INVENTOR
I. M. ROSS
BY
W. H. Wilson, Jr.
ATTORNEY

INVENTOR
I. M. ROSS
BY
D. H. Wilson, Jr.
ATTORNEY

INVENTOR
I. M. ROSS
BY D. H. Wilson, Jr.
ATTORNEY

United States Patent Office 2,877,358

Patented Mar. 10, 1959

2,877,358

SEMICONDUCTIVE PULSE TRANSLATOR

Ian M. Ross, New Providence, N. J., assignor to Bell Telephone Laboratories, Incorporated, New York, N. Y., a corporation of New York Application June 20, 1955, Serial No. 516,521

5 Claims. (Cl. 307—88.5)

This invention relates to pulse translators and more particularly to semiconductive devices which transfer operation from one electrode to another in response to the application of suitable pulses of energy.

One general object of this invention is to improve the structure and the performance characteristic of semiconductive devices having a multiplicity of electrodes.

More specific objects of this invention are to enable switching or stepping functions to be attained in a single semiconductive device, to positively displace operation in a semiconductive device from one electrode to another in a predetermined sequence, to simplify the equipment necessary for sequential operation of electrodes and associated circuits, and to effect stepping or switching operations at high speeds.

In accordance with the above objects, one feature of this invention resides in a semiconductive device providing conduction paths between a common connection and each of an array of connections which each have a preferred region of conduction adjacent the path of the next connection in the array. Conduction from a connection of the array to the common connection may be stepped or shifted selectively to a path between the next connection in the array and the common connection by the application of a suitable impulse, the conduction path shifting one connection for every impulse or every second impulse.

Another feature resides in establishing along its surface a gradation in the potentials across a rectifying barrier region in a semiconductive body whereby one portion of the surface is at a higher potential than other portions. When this potential is such as to bias the region in its forward direction of conduction there is a tendency to concentrate the current in the portion across which the higher potential is developed.

Another feature of this invention resides in a switching or stepping device comprising a plurality of sections each comprising a switching structure having a bistable characteristic offering a high impedance in the off condition and a low impedance in the on condition, and offering stability in either condition when subjected to a wide range of voltages intermediate the actuating voltages. One mechanism utilized in realizing this feature is conductivity modulation of semiconductive material positioned between a source of minority charge carriers for the material and a drain electrode for those carriers. Alternatively the sections can be of a type which exhibits current multiplication when subjected to appropriate potentials and actuating conditions.

In accordance with another feature of this invention the preferred region of conduction is established at one portion of each connection of the array by positioning that portion closer to the common connection to the body than the other portions.

In accordance with a further feature of this invention a preferred region of conduction is localized in the vicinity of the point at which an external lead is connected to each section of the array by causing a portion of that connection to exhibit substantial resistance to the flow of current along its length. A connection serving this function may conveniently be of semiconductive material in the form of a zone of conductivity type opposite that of the body with which it is associated, forming a rectifying junction with that body. The degree of bias developed along the zone is then dependent upon its resistance per unit length in the regions spaced from a low resistance or metallic contact thereto, the distance from that contact and the currents flowing along the zone. In embodiments utilizing this feature for stepping purposes the lead advantageously engages the region at a point close to a portion of the next connection of the array.

In accordance with a still further feature of this invention, each connection can be arranged in a circuit which ceases conducting when conduction is initiated in the next succeeding connection in the array.

This invention, together with the above and other objects and features thereof, will be more fully appreciated from the following detailed description when read with reference to the accompanying drawings, in which.

Figure 10:
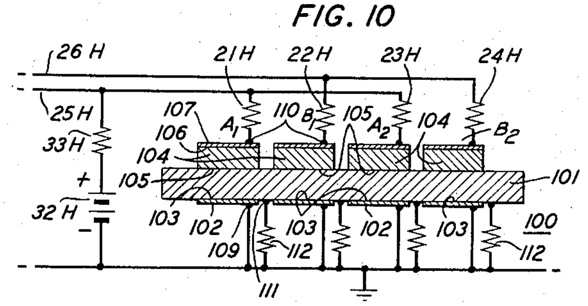
Figure 11:
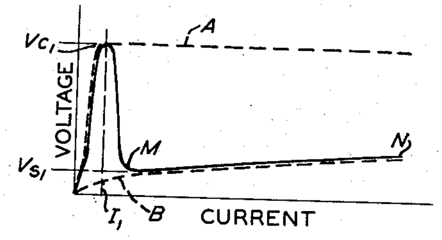
Figure 12:
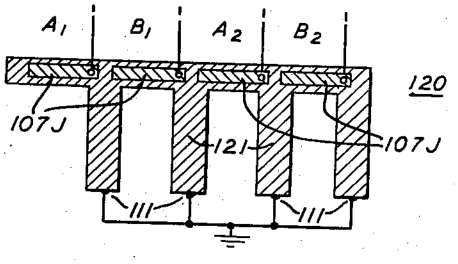
Figure 13:
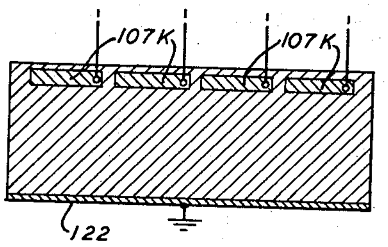

Figs. 10, 12, 13, and 14 are stepping devices of this invention utilizing hook collector characteristics to realize bistable operation, Fig. 13 being arranged for reversible stepping; and Fig. 11 is a graph representing a typical characteristic of a circuit controlling element or switching element providing one step in the hook collector devices of Figs. 10, 12, 13, and 14.

In the drawings reference characters having common numbers have been employed to identify like elements in the respective embodiments.

Referring now to the drawings, Figs. 1 through 8 each disclose a semiconductive stepping device wherein the individual steps are achieved by switching sections of the device from a high impedance or low current to a low impedance or high current state of operation by conductively modulating a portion of the material associated with the operative step.

Figure 1:
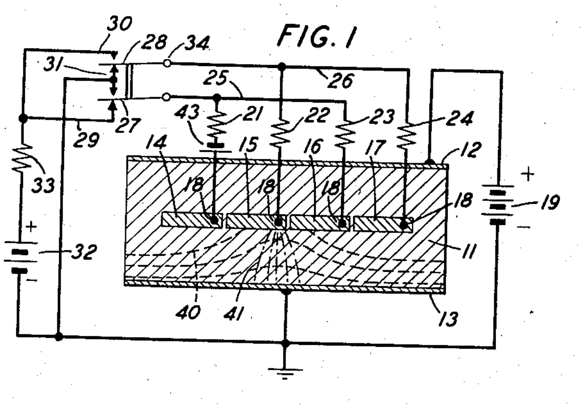
Fig. 1 is a schematic representation of one form of semiconductive stepping device encompassed by this invention.

As disclosed, for example in Fig. 1, the device comprises a semiconductive body 11 of a material such as germanium, silicon, combinations thereof, or the intermetallic compounds of group III and group V elements, which in the illustrative embodiment is n-type, although by a suitable reversal of the polarities applied to the device it could as readily be p-type. In operating these devices it is necessary that a field be developed across the width of the body. In order to reduce the power dissipation in the body, incidental to the generation of this field the body should be thin. A high resistivity material, for example material which exhibits intrinsic semiconduction at room temperature, facilitates the realization of high fields and low power dissipation.

Particularly, advantageous results are obtained when high conductivity contact zones are made to intrinsic material. For example, swept intrinsic operating characteristics resulting in higher effective resistivities, lower power dissipation, and more efficient operation are realized in an intrinsic body structure having a high conductivity n-type terminal zone as the positive terminal. The body is advantageously of single crystal form and may be conveniently derived from large semiconductor bodies by cutting with a diamond saw and lapping and etching the surfaces or by cutting the body with the electrolytic etching techniques disclosed in J. F. Barry-N. C. Seeley application Serial No. 479,109, filed December 31, 1954. In either of these forms the body can conveniently be of 10 mils or less thickness normal to the plane of the paper, as depicted in the drawings.

A pair of elongated, equally spaced, low resistance, substantially nonrectifying, contacts 12 and 13 are applied to the opposite edges of the semiconductive body. These contacts can be in the form of strips extending along the edges of the body and bounding the regions in which the stepping operations occur. They may be formed by alloying strips of material such as lead-arsenic, in the case of n-type germanium, over each edge, by plating strips to the edges, or by soldering contacts either directly to the body or to very highly doped low resistivity regions thereon, n-type regions bordering the intermediate and contiguous n-type region constituting the main portion of the body.

An aligned array of asymmetrical connections in the form of rectifying junctions between the major body portion 11 and the rectangular p-type zones 14, 15, 16, and 17, of limited extent, is provided on the surface of the n-type body. These rectangles have their major dimension parallel to the edges of the body upon which contacts 12 and 13 are mounted. Thus the major dimensions of the zones are normal to the paths from the zones to the body contacts. For reasons which will become apparent hereinafter, the zones should be so arranged and constructed that they are within a distance from the negatively poled contact 13 such that a large proportion of the minority carriers injected from the zones reach that contact. They should be of such resistivity and cross-sectional area in the dimension normal to the plane of the paper that the resistance along their major length from end to end, at reasonable currents, a milliampere or greater, causes a potential drop somewhat greater than $$\frac{kT}{q}$$

about 0.025 volt in germanium at room temperature, and they should be positioned closely adjacent each other in end to end relationship. This potential drop causes the rectifying junctions between the zones and the body to be more positively biased immediately under the restricted area contact to the zone than at points spaced therefrom. Thus, at high currents the major portion of the minority carrier current emitted from the junctions at the zone-body interfaces into the body is concentrated under the contact and those portions further spaced therefrom emit an amount inversely related to the spacing.

In order to control the shape and thickness of the zones 14, 15, 16, and 17 of the stepping sections extending between terminals 18 and connection 13, special processes are necessary. One such process involves applying indium ribbons about 50 mils long, 10 mils wide, and 10 mils thick, over those areas of an n-type germanium wafer of 20 ohm-centimeters resistivity, 5 to 10 mils thick, upon which it is desired to form the p-type regions. Heating of the wafer and ribbons to 500° C. for 5 to 15 minutes in a nonoxidizing atmosphere such as forming gas, and cooling to room temperature in 30 seconds, alloys the indium into the n-type wafer. The region of recrystallized p-type germanium formed in the semiconductive body immediately under the indium is revealed by etching the indium from the wafer face with hydrochloric acid. Indium dots can then be fused on the p-type zones to provide restricted area, low resistance contacts thereto. Ohmic body contacts are formed on the body with a lead-tin eutectic alloyed thereto at some temperature in excess of 350° C. Nickel leads may be soldered to the indium dots and the body contacts. The p-type zones produced in this manner have a resistance of 500 ohms over their 50 mil length so that at four milliamperes of emission current 90 percent of the emission occurs within 10 mils of the ohmic contact. Concentration of a suitable proportion of the injected current from an emitter zone, such as zone 14, in a desired portion of that zone, can be obtained by constructing that zone to satisfy the appropriate parameters in the equation $$I/I_T=\frac{x/y}{1+x/y}$$

where $I_T$ is the total current injected from the emitter in amperes;
$I$ is the current in amperes injected from the emitter over a region extending from the ohmic contact on the emitter zone to a point $x$ along that zone;
$x$ is the distance from the ohmic contact on the emitter zone in centimeters;
$\rho$ is the resistance per unit length of the material of the emitter zone in ohms per centimeter; and $$y=\frac{2KT}{q}/\rho I_T=\frac{1}{20}/\rho I_T$$

Another technique of forming these p layers is to evaporate aluminum through suitable masks placed on the surface of the n-type wafer, alloying and/or diffusing the aluminum into the wafer surface a limited distance by a controlled temperature cycle, and removing any aluminum which remains on the surface from other than the regions of the connection by etching.

A further technique for forming the p-type stepping regions is to produce a p layer over the entire surface of an n-type body having a thickness dimension somewhat greater than required in the final device and then removing the undesired p material by masking those regions to be maintained and etching or otherwise removing the remaining surface portions. P surface areas of this nature could be formed either in the original growth process of the semiconductor body, by diffusion or, by an alloying and regrowth process.

Each stepping electrode or p-type region is provided with a low resistance, substantially nonrectifying, electrical connection 18 which may be applied by alloying a suitable material such as indium thereto or by bonding a gold lead doped with gallium thereto.

The device, as described above, is provided with a polarizing means, such as battery 19, connected across contacts 12 and 13 in a manner such that contact 12 is positive with respect to 13. Loads, represented by resistances 21, 22, 23, and 24, are connected to sections 14, 15, 16, and 17, respectively, and alternate sections are connected to common leads 25 and 26 to some means, represented by switching contacts 27 through 31, for rapidly changing the potential applied to these stepping sections from ground to a suitable positive potential derived from a source represented by battery 32 through a common limiting resistor 33.

Figure 2:
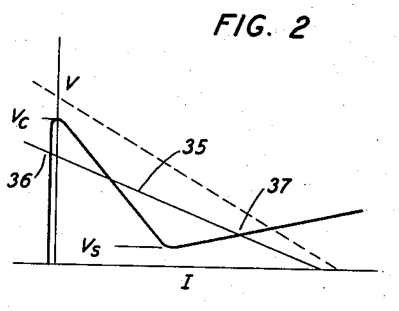
Fig. 2 shows the voltage current characteristic of an individual stepping section of the device shown in Fig. 1.

In operation, any section of the device of Fig. 1, operating as a stepping element, has the characteristic between its terminal 18 and terminal 13, as depicted in Fig. 2, wherein under one operating condition load line 35 intersects the operating charactersitic at a point 36 representing a high impedance or low current condition and another point 37 representing a low impedance or high current condition. The position of this load line is determined by the magnitude of the common resistance 33 and the individual load resistance associated with the operating section. The shape of the voltage current characteristic between electrodes 18 and 13 depends upon the device geometry and the applied potentials.

With terminal 12 biased positively with respect to the grounded terminal 13, the material in the n-type semiconductive material under the p-type zones 14 through 17 will take up an intermediate positive potential, for example $V_c$ as shown in Fig. 2. If contact 18 were grounded so that the potential applied between 18 and 13 were zero, the p–n junctions existing between each of the stepping sections and the major portions of the n-type body is biased in the reverse direction and a reverse saturation current will flow across the junction. This saturation current will continue to flow as the potential between terminals 18 and 13 is made positive by means of the source 32, up to a value about equal to $V_c$. When that potential exceeds $V_c$, the p-type material will be biased positive with respect to the n-type material with which it is in contact and the p-n junction will be biased in the forward direction of conduction. When the p-type material contains a greater predominance of acceptors than the n-type material does donors, the forward current across the p–n junction will consist predominantly of positive charge carriers or holes flowing from the p-type material to the n-type material.

The high current operation of the stepping section in these devices requires that the transit time for holes from sections 14 through 17 to electrode 13 through the body 11, constituting a zone of substantially uniform electrical characteristic, be less than the hole lifetime of the n-type material of that zone. The electrical field in the n-type material between the stepping sections and electrode 13, due to source 19, will sweep the holes thus emitted into the n-type material toward contact 13. If his field is high enough, the hole lifetime is long enough in the n-type material, and the separation from the point of injection to the electrode 13 is small enough, the holes will reach electrode 13 before recombining. The presence of these injected holes in the n-type material between 18 and 13 will decrease the resistance of the path across which they travel by drawing a neutralizing charge of electrons into that region to increase the number of free charge carriers (both holes and electrons) available for conduction, and consequently the voltage across these terminals will decrease while the current increases as shown in Fig. 2. This mechanism will be referred to hereinafter as conductivity modulation. Thus, as the current increases the voltage falls, giving rise to a negative resistance portion in the characteristic of Fig. 2. The negative resistance will persist until the voltage, and thus the field due to source 19, becomes too small to sweep the holes to contact 13 before recombining. When this occurs the region of conductivity modulation will start to decrease and the resistance will again become positive and stabilize at the intersection with the load line 35 at point 37 in the characteristic of Fig. 2. Thus, any stepping section of the device of Fig. 1 is a bistable device having a first condition as indicated at point 36 in Fig. 2, where the n–p junction is reverse biased and passes a small current and a second condition at point 37 on Fig. 2 where that junction is forward biased and passes a high current.

As noted above, the p regions 14 through 17 are elongated so that the resistance along the length of the p-type strip from its left-hand end in Fig. 1 to the low resistance contact 18 thereto, is designed to be such that a current of the order of one milliampere flowing along its length develops a potential drop large compared to $$\frac{kT}{q}$$

A resistance of a few thousand ohms would develop such a drop.

While any of the stepping sections are in the low current portion of their characteristic, the potential drop along their lengths will be small compared to $$\frac{kT}{q}$$

and, therefore, from the point of view of collection or injection of charge carriers the p-type layer will be effectively an equipotential. When one of these sections is first placed in the high current condition of operation, minority carrier injection is likely to be initiated from any portion of the zone of that section. However, while a large current is flowing the majority of the current will be injected in the vicinity of the low resistance contact, since the potential drop developed along the length of the p-type region in passing current to portions remote from the low resistance contact would impose a lower forward bias on the remote portions, reducing the effective emission therefrom. The density of emission and the efficiency of the junction as a conductivity modulating element is greatest under the contact 18 and decreases with increased separation therefrom. Thus, as shown in Fig. 1 wherein the section including zone 15 is depicted as in the operative condition, a pattern of equipotential lines 40 is developed and the current path between zone 15 and electrode 13 is as represented by flow lines 41.

The pattern of equipotential lines 40, as shown in Fig. 1, indicates that when zone 15 is in its high current condition the body material adjacent the left-hand end of zone 16 is at a lower potential than the material adjacent any portion of zone 14. Hence, the critical voltage of zone 16 is less than that of zone 14 and, therefore, zone 16 enters the high current condition in preference to zone 14 when switching action is initiated. This pattern of equipotentials determines the dimensions of zones and their relative positions for satisfactory sequential operation. The relationship between zone length and zone separation should be such that when zone 15 is in its high current condition the concentration of the conductivity modulation effects under its right-hand end decreases the potential of the body material under the left-hand end of zone 16 more than under the right-hand end of zone 14. Thus, the spacing of adjacent zones should be small compared to their length. For example, for a device having zones 50 mils long, a spacing of 5 mils has been found suitable.

As set forth above, the conductivity of the region in which the flow lines 41 are shown has been modulated by the injection of holes. It will be noted that this region is principally under the right-hand end of the zone 15 and extends to some degree into the portion of body 11 between zone 16 and electrode 13. However, zone 16, with the switch 34 in the position indicated, is connected to ground through contacts 27 through 31. Minority carrier injection, and thus the greatest portion of the current flowing through the switching device, can be transferred from the section including zone 15 to the section including zone 16 in this structure by removing the forward bias from zone 15 and applying a forward biasing potential to zone 16. This transfer of the conducting path requires that the potentials on the adjacent regions be shifted in an interval which is short compared to the transit time of holes in the n-type material to contact 13. Under these conditions the holes injected between the right-hand end of zone 15 and contact 13 will still be present under the left-hand end of zone 16 to reduce the potential of the body portion adjacent thereto and enable zone 16 and the transfer of source 32 from zone 16 to 17 other zones connected to common lead 25.

Upon operation of the switch 34, so that contact 27 engages contact 31 and contact 28 engages contact 30, zone 15 is brought to ground potential and zones 14 and 16 tend to be raised to a potential in excess of $V_c$ by being connected to source 32. Thus, the n-p junctions between zones 14 and 16 are both biased in the forward direction and both will tend to emit minority charge carriers or holes into the n-type material. However, in view of the conductivity modulation of the material under the left-hand end of zone 16, by the hole injection from the previously conducting zone 15, the peak potential required to place zone 16 in the emitting condition is somewhat less than that required for zone 14 and, therefore, the emission path transfers from the right-hand end of zone 15 to the left-hand end of zone 16. As in the case of zone 15, the potential drop along the length of zone 16, due to the current therein, tends to cause this emission path to shift toward low resistance connection 18 at the right-hand end of zone 16 and to remain in that region until the source 32 is removed or the potential across the p-n junction between zone 16 and body 11 is reduced below $V_s$, as shown in Fig. 2. Zone 14, while initially subjected to the same potential as zone 16, is prevented from firing by limiting resistor 33, since the current drawn by the firing of zone 16 reduces the potential on the lead connection to switch contact 25 below $V_c$ for zone 14, thereby maintaining its junction with the n-type material of body 11 reversed biased and its operating characteristic in the low current condition.

The next reversal of switch 34 will advance the hole emission to the stepping section, including zone 17, since the left-hand end of zone 17 will be placed in favorable condition to emit holes by the conductivity modulation of the region thereunder due to the hole injection of zone 16 and the transfer of source 32 from zone 16 to 17 will reduce the potential zone 16 below the sustained voltage $V_s$ and raise the potential on zone 17 sufficiently to bias the junction in the forward direction and exceed $V_c$, its critical voltage, as outlined in the case of the transfer of the injection from zone 15 to zone 16.

While the device shown in Fig. 1 has been limited to four sections, it can be extended to any number and for each reversal of the switch 30 the conducting section will move to the next adjacent step. This action is analogous to that of a gas stepping tube and hence a semiconductive device of this nature can be used in the manner that gas stepping tubes are employed, for example in counting. In the configuration shown in Fig. 1, the counting operation advances from left to right. Thus, it is desirable that the section at the left-hand end of the devic be the first to enter the high current operating condition upon actuation. A number of means can be employed to preferentially establish minority carrier injection from one section which has been designated the starting section. The lead from the starting section can be brought out separately and an added positive potential applied to this lead so that as the starting potential is increased the starting section steals the current flow from any other section and continues to conduct at the sustained voltage level. An arrangement of this nature is shown in Fig. 1 wherein battery 43 adds a slight positive potential which must be less than the sustaining voltage $V_s$ for the section 14.

Figure 3:
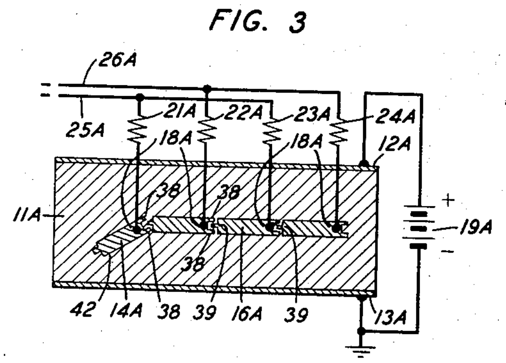
Fig. 3 shows another form of stepping device in accordance with this invention.

Another means of priming or preferentially starting hole emission from a particular zone is disclosed in Fig. 3 wherein the geometry of that zone has been tailored to insure that it conducts first by locating a portion 42 of the zone closer to electrode 13A than any portion of the other zones, whereby the reverse potential developed by current flowing in the semiconductive body 11A from electrode 12A to electrode 13A is less for those portions of the body which are closer to ground potential. As the potential applied to lead 25A increases, it reaches the critical voltage necessary to bias a portion of zone 14A in the forward direction before any portion of zone 16A reaches that condition. The structure of Fig. 3 also illustrates another means of insuring sufficiently intimate relationship between the conductivity modulated region adjacent the preferred region of conduction in zone 14A under contact 18A and the starting portion of the next adjacent stepping section.

This is accomplished by providing an interdigital arrangement between portions of adjacent zones. A pair of fingers 38 of p conductivity type material project from the end of each zone adjacent the low resistance contact thereto in bounding but spaced apart relation to a finger 39 projecting from the end of the next adjacent zone. This insures that emission from the fingers 38 of the first zone modulates the conductivity of the n-type material thereunder and necessarily modulates the conductivity of some material in the current path between body connection 13A and the next adjacent zone, namely that material under the finger 39 of the next adjacent zone.

The device of Fig. 3 otherwise functions in the same manner as Fig. 1. It can be driven by a switching arrangement as shown in Fig. 1, or some other driving means providing an equivalent change in the potentials applied to the stepping sections. Operation is initiated by applying a potential in excess of the $V_c$ for the section to be triggered into the operating condition and is terminated for that section by reducing the applied forward potential below the sustaining potential $V_s$.

Figure 4:
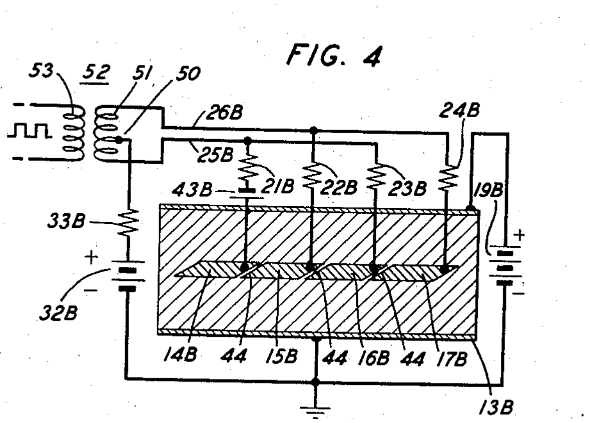
Fig. 4 shows a further embodiment of a stepping device in combination with a transformer coupling for effecting the stepping operation.
Figure 5:
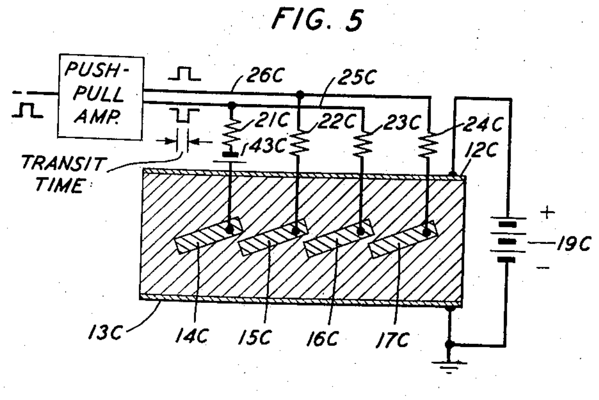
Fig. 5 is another form of stepping device driven by a push-pull amplifier.

Figs. 4 and 5 also show structures having stepping zones 14B through 17B and 14C through 17C, respectively, with geometries adapted for the transfer of minority carrier emission from one section to the next. Both of these devices have portions of the adjacent zones in their aligned arrays which overlap along their current paths to electrode 13. In Fig. 4, the zones are each in the form of parallelograms wherein the minority carrier emission under steady state conditions from one zone overlaps the starting portion 44 of the next adjacent zone extending into the path between electrode 13B and the portion of the one section from which the major portion of the sustained current flows. Fig. 5 shows rectangular stepping zones inclined with respect to electrodes 12C and 13C so that the starting region of all but the first stepping zone overlaps the sustaining region of the preceding zone and is projected into the path in which conductivity modulation occurs due to minority carrier injection from that zone.

A transformer coupled drive is shown associated with the stepping device of Fig. 4. This configuration enables a steady state bias somewhat below $V_c$ to be applied continuously to all stepping sections of the device by virtue of the center tap connection 50 to the secondary 51 of transformer 52. Stepping pulses are applied to the device by means of passing them through the primary 53 of transformer 52. These pulses are superposed upon the steady biasing potential from source 32B. The rise transient of an applied pulse raises the potential applied to lead 25B sufficiently so that zone 14B is biased in the forward direction and is driven into its high current operating condition. The transient associated with the drop of the pulse reduces the potential on lead 25B below the sustaining voltage $V_s$ of zone 14B and raises the potential applied through lead 26B to zone 15B above its critical voltage so that minority charge carrier injection is initiated from that zone. A second pulse will cause another two-step cycle to occur in the device, advancing the minority carrier injection first to zone 16B and then to 17B. In order to insure activation of successive sections, the pulse repetition rate should not be so short that two pulse rises occur within an interval equal to the transient time of minority charge carriers from the p-type switching sections to electrode 13B. In the event that the pulse repetition rate is such that the leading edges of two pulses occur in an interval less than a transit time, the region under the stepping section preceding the activated section will still be conductivity modulated to some degree due to the presence of minority carriers. Hence, there may be some tendency for the minority carrier emission to switch from the operating section to its preceding section rather than its succeeding section.

The drive for the embodiment of Fig. 5 is a push-pull amplifier having the characteristic that a pulse applied to its input produces pulses of opposite polarity on the two groups of stepping sections connected to its output leads. A constant potential is applied to the stepping sections by the bias supply and load resistance of the push-pull amplifier which function in the manner of the bias supply 31 and load resistor 32 of Fig. 1. A positive output pulse, as illustrated on lead 26C, augments the bias on that lead to trigger one of the sections associated with that lead to the minority carrier emitting condition. At the same instant a negative pulse is applied to the sections associated with lead 25C to reduce the potential on those sections below the sustaining voltage, thereby causing the emission of minority carriers from the operating section connected thereto to cease. As in the case of the transformer coupled drive of Fig. 4, in order to assure the positive advancement of the minority carrier emission to a succeeding stepping section and to guard against firing of the preceding section, the output pulse duration should exceed the transit time of minority carriers from the stepping sections to electrode 13C.

Figure 6:
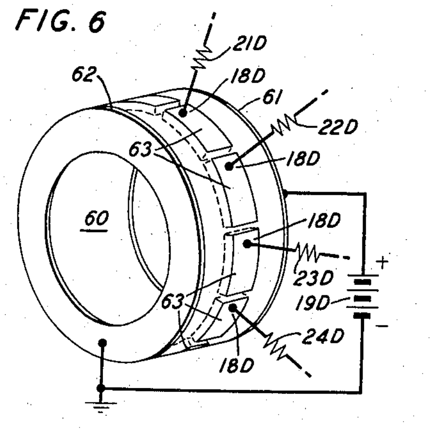
Fig. 6 is a perspective view of a ring configuration of conducting paths enabling the device to be reset by advancing the count to the start path.
Figure 7:
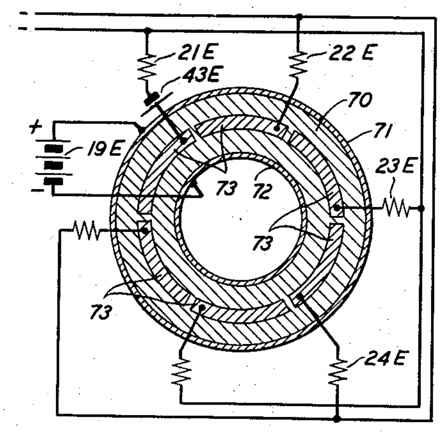
Fig. 7 shows another ring geometry.

Figs. 6 and 7 illustrate ring stepping devices utilizing some of the features described above. Fig. 6 represents a geometry wherein current flow parallels the axis of a cylindrical semiconductive body 60 having annular electrodes 61 and 62 on its opposite ends across which a source 19D is connected to establish a field in the semiconductor and a reverse bias at the rectifying junctions between the stepping zones 63 and the body. Any of the techniques of insuring a preferential order of operation of the stepping sections, both to initial operation and sequential operation, as discussed with regard to Figs. 1 through 5, are applicable to the ring configuration. Driving means and output utilization means of the type discussed above can be applied to this structure. This geometry offers particular advantages in that it can be run through a number of cycles, for example as a decade counter, and can be stepped in one direction to return to its starting section.

The ring structure of Fig. 7, in addition to offering the features available in that of Fig. 6, provides a means for developing a greater field in the semiconductor for a given applied voltage than any of the preceding arrangements. In this instance, the semiconductive body 70 is annular in form and electrodes 71 and 72 are provided on outer and inner peripheries and are substantially equally spaced along their entire lengths. A potential is developed across the body between the electrodes 71 and 72 of such polarity that minority carriers injected from the zones 73 of the stepping sections are drawn by the field therein toward the inner periphery. A convergent geometry for charge flow is attained in this structure wherein the potential in the semiconductive body increases as the logarithm of the radius. Thus stronger fields are present in the portions of the body 70 near the inner electrode 72 than in the portions spaced further from that electrode. This permits the device to be operated with lower voltages applied between the main body electrodes 71 and 72 for a given electrode separation than are necessary in the devices of previous embodiments and a higher field is concentrated in the region between the stepping zones and the inner electrode whereby the transit time of the inner electrode of carriers injected at the junctions between the body and the zones is reduced.

Figure 8:
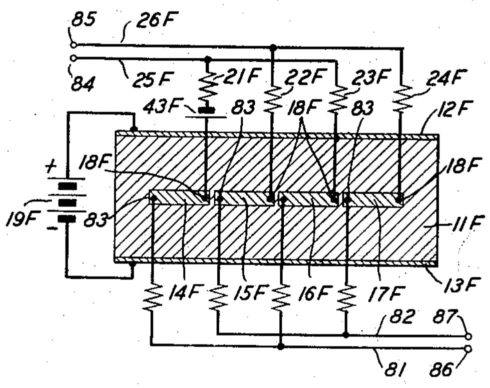
Figs. 8 and 9 are stepping devices and circuits according to this invention arranged to step in both directions so that they can add and subtract.
Figure 9:
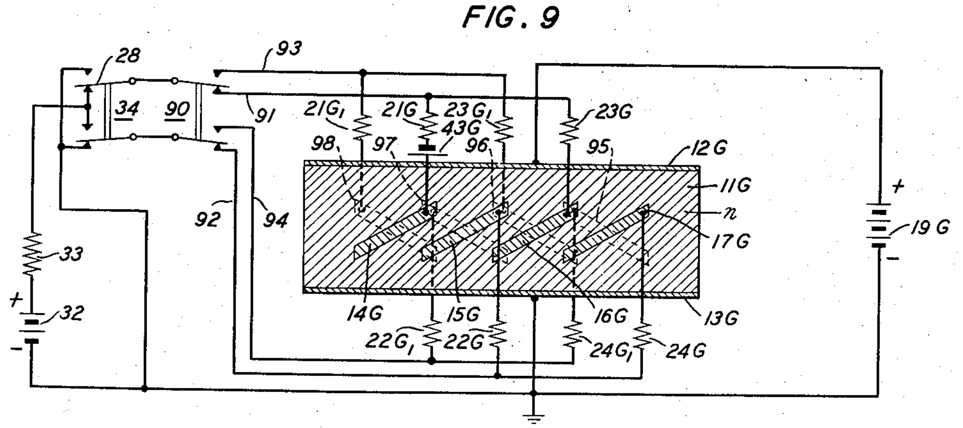

Figs. 8 and 9 show stepping devices which permit the advance of the conduction path from section to section in either direction and this function adds and subtracts. Fig. 8 coresponds to the construction of Fig. 1 in that it is provided with a pair of common leads 25F and 26F to first and second terminals 84 and 85, respectively, and connected through individual loads 21F through 24F to a first series of restricted contacts areas 18F on the right-hand end of first and second groups of zones 14F and 16F, and 15F and 17F, respectively. The application of a positive pulse to lead 25F causes zone 14F, to which primary source 43F is connected, to exceed its $V_c$ and begin conduction to electrode 13F. Subsequent alternate pulses to leads 26F and 25F will trigger sections to the right into their conducting condition while the previously conducting section is turned off by reducing applied potential below its sustaining voltage $V_s$.

The direction of advancement of triggered sections can be reversed by transferring operation to leads 81 and 82 connected to third and fourth terminals 86 and 87, respectively. This transfers the major portion of the sustained minority carrier emission from the right-hand end of stepping zones 14F through 17F to the left-hand end of those sections by establishing a circuit to the sections through a second series of limited area, low resistance connections 83 on their left-hand ends. The mechanism causing this shift is the same as that which functions in the previously described embodiments. The connections 83 engage only a limited portion of the sections and are spaced from the high conductivity surfaces of contacts 18F; hence, transverse current flow along the sections due to their high resistance per unit length outside of the vicinity of connections 18F and 83 causes a substantial potential drop and biases the portions of the rectifying barrier between body 11F and the zones which are spaced from the operative connections 83 to a lower forward bias than those portions in the vicinity of the connections. Since the region of conductivity modulation in body 11F between the operative zone of one group and electrode 13F extending beyond that zone is most effective under the right-hand end of the zone to the left, that zone to the left is primed and the application of potentials which reduce the operating zone below its sustaining voltage and then raise adjacent zones of the other group toward their critical firing voltages trigger the zone to the left into operation.

When the device of Fig. 8 is operated to advance the conducting path toward the right from zone 14F to zone 16F, pulses are applied to leads 25F and 26F. The path can be advanced to the left from 16F and 15F by transferring biasing source 32 and common load 33 (not shown in Fig. 8) from leads 25F and 26F to leads 81 and 82. This causes the major portion of the path to shift from the right- to the left-hand end of zone 16F so that upon the application of a potential to lead 82 raising zone 15F above its critical voltage, and a potential on lead 81 which reduces zone 16F below its sustaining voltage, the path transfers to zone 15F. The transfer enhancing techniques and starting techniques suggested above can be applied to the elements associated with each direction of advancement in this structure.

Bidirectional stepping of the current path can also be accomplished in the structure of Fig. 9 by means of a separate set of stepping sections for each direction of operation. In order to simplify the explanation, the pulsing mechanism of Fig. 1, including source 32, common resistor 33, and pulsing switch 34, has been shown although other mechanisms are equally applicable. The pulses are applied selectively by means of switch 90 to one of two pairs of common leads, the first pair 91 and 92 serving to advance the conduction path from left to right and the second pair 93 and 94 advancing it from right to left. Leads 91 and 92 are connected to zones 14G on the front face of body 11G in a manner corresponding structurally and functionally to zones 14C through 17C of Fig. 5. Leads 93 and 94 are connected to zones 95 through 98 which are similar to zones 14G through 17G and are located on the rear face of body 11G opposite those zones in inverse order. The thickness of body 11G between these sets of stepping zones is dictated by the same considerations employed in determining the separation of adjacent zones in each set so that the equipotentials resulting from the operation of a zone on one face in the high current condition extend to the material under its corresponding zone on the opposite face and reduce its critical voltage. Interaction obtained in this manner enables the switching path to be advanced along the set of sections in which operation is initiated or to be transferred from the set on one face to the set on the other face by a suitable application of potentials.

When the device of Fig. 9 is in the operating condition illustrated, with switch 90 connected to leads 91 and 92, a current path will be established between zone 14G and electrode 13G by connecting switch 34 so that contact 28 is connected to source 32. Operation of switch 34 will advance the current path to the right through zones 15G, 16G, and 17G. The path can be switched to one of zones 95 through 98 and returned to the left by connecting the pulsing source through switch 90 to leads 93 and 94 so that the potentials applied to the zones 14G through 17G are applied to their corresponding zones 98 through 95, respectively. Considering zone 17G to be operating, the positive terminal of source 32 is connected thereto through switches 34 and 90. The potential of source 32 is transferred to zones 95 and 97 on the rear face of body 11G by operating switch 90. Zone 95 is in the body region which has been conductivity modulated by the current formerly flowing from zone 17G; hence, it triggers into a conducting condition before the critical voltage for zone 97 is reached. Pulsing of leads 93 and 94 as by switch 34 then advances the conducting path through 96, and so forth, to the left. Transfer cycles of this nature can then be repeated between sections on the front and rear faces of body 11G.

The reversible stepping structures of Figs. 8 and 9 can be modified so that additional preferred sections of initial operation are available in either direction of advancement. For example, as suggested with reference to Fig. 1, a priming bias can be applied to one of the sections in that set operating from left to right, provided its aiding potential does not exceed the reduction in the critical firing potential due to conductivity modulation by an operating section adjacent any of the sections connected to its pulsed lead. Further, the reversing techniques are applicable to the ring geometries of Figs. 6 and 7.

An extension of the geometry of Fig. 9 can be used to provide a closed array of stepping sections having the features of the ring structures of Figs. 6 and 7. The switching sections can be carried around the end of the semiconductive body, continued along the rear surface and turned back onto the front face. An arrangement of this nature should be employed upon a body which is thick enough to avoid the extension of the actuating influence of the conductivity modulated region under one section through the body to a section on the opposite face advantageously the length of a zone.

Stepping or counting devices can also be formed of a plurality of coupled transistor sections each having a current multiplying collector. In such configurations coupling can be advantageously accomplished by utilizing a base or equivalent region of semiconductive material which is common to all transistor sections and is arranged to exhibit preferred regions of conduction, whereby the operation of one section primes a preferred next adjacent section for conduction upon the application of suitable actuating potentials. Several forms of multiplying collectors are available which offer the desired characteristic of high impedance below some critical voltage and low impedance at some much lower sustaining voltage once the critical voltage has been reached. These forms include avalanche multiplying devices such as those disclosed in K. B. McAfee application Serial No. 340,529, filed March 5, 1953, and K. G. McKay application Serial No. 464,737, filed October 26, 1954, and hook collector transistors, for example of the type shown in W. Shockley Patent 2,655,609 and J. J. Ebers Patent 2,655,610, both issued October 13, 1953.

The stepping or counting devices of Figs. 10, 12, 13, and 14 all utilize a plurality of self-biased junction transistor sections having a hook collector or conjugate emitter region which offers a voltage-current characteristic of the form shown in Fig. 11 between each pair of section terminals. The basic stepping section element of these devices includes a semiconductive body of single crystal material containing four contiguous zones of alternately opposite conductivity type. Referring to Fig. 10, the device comprises four elements each having a common base region 101, for example a zone of p conductivity type which is thin enough so that transistor action can take place across it, for example one mil for germanium, an emitter region 102 comprising a zone of n conductivity type contiguous therewith, and forming an n-p junction 103 at its interface with the base. A collector region 104 comprising a zone of n conductivity type and thin enough so that transistor action can take place across it, for example one mil in germanium, is positioned across the base from each emitter region and forms an n-p junction collector 105 at its interface with the base. Current multiplication is realized in this structure by a third n-p junction 106 between collector region 104 and a p conductivity type zone 107. Holes are injected into the collector region from this third junction in response to the current entering collector region 104 as a result of electrons injected at emitter junction 103, whereby an output current of greater magnitude than the input current at emitter junction 102 is realized in some stages of operation.

Three nonrectifying contacts 109, 110, and 111 are established to each stepping section of stepping device 100. Contacts 109 and 111 can be considered as the emitter and base contacts, respectively, of a conventional junction transistor while contact 110 corresponds to the conjugate emitter or hook collector contact of a junction transistor provided with a hook collector. A feature of hook collector junction transistors is the current multiplication attainable therefrom.

The operation of each switching section and the appropriate value of resistor 112 can be determined for a particular structure from the following discussion considering one section of the structure shown in Fig. 10. With a bias voltage in the direction shown the junction 105 between regions 101 and 104 will be biased in the reverse direction while the other two junctions 103 and 106 will act as emitters. Minority carriers will thus diffuse across both regions 101 and 104, and the current amplification factors for such processes are $\alpha_1$ and $\alpha_2$, respectively. If then the saturation current for the reversed bias junction 104 is $I_s$ it can be shown that the current I through the device is given by $$I=\frac{I_s}{1-(\alpha_1+\alpha_2)} \qquad (1)$$

Equation 1 shows that if the sum of the $\alpha$'s is less than unity then a finite current flows which is equal to some multiple of the saturation current. Each of the $\alpha$'s is independent of the applied voltage for values of voltage greater than 25 millivolts, hence I will be independent of voltage and the V–I characteristic of the device will be as shown in curve A of Fig. 11. Equation 1 also shows that the condition with the sum of $\alpha_1$ and $\alpha_2$ greater than unity is an impossible condition because as the sum approaches unity the current approaches infinity and then further increases in the sum would yield negative values of I. Thus, if the sum of the $\alpha$'s with an applied voltage greater than about 25 millivolts is greater than unity, the voltage across the device will never reach saturation values. The V–I characteristic will then be of the form shown in curve B of Fig. 11. Hence, depending upon the values of $\alpha_1$ and $\alpha_2$ the device can appear as either a very high or a very low impedance.

When a resistance 112 is connected between regions 102 and 101 it will tend to by-pass some of the current I around the emitting junction between regions 102 and 101. This effect may be taken into account by considering that the $\gamma$ of this junction has been decreased and therefore that the value of $\alpha_1$ has been decreased. However, the exact value of $\alpha_1$ will depend upon the ratio of the resistance 112 to the slope resistance of the forward bias junction between regions 102 and 101. Since the latter decreases with increasing currents the effective value of $\alpha_1$ will increase with current. Hence, a device in which the sum of the $\alpha$'s with no resistance present is greater than unity, having a resistance 112 of appropriate value, will have $\alpha$'s which total less than unity for currents less than a certain value, $I_1$. A suitable value of $I_1$ is shown in Fig. 11. The V–I characteristic of the devic will then proceed from 0 voltage along curve A of Fig. 11 until when breakdown occurs, at $V_c$ the current reaches the critical value $I_1$. At higher currents the sum of the $\alpha$'s will then be greater than unity and the characteristic must continue along curve B. It will be noted than any breakdown mechanism which gives an increase of current with voltage and hence an increase of $\alpha$ with voltage can be employed as a switching section having a high and a low impedance state such as is employed in crosspoint applications. Thus, such a device would work equally well if the breakdown were due to zener, to avalanche, or even to surface leakage.

The order of magnitude of resistor 112, which can be used in a device as shown in Fig. 10, is the same as slope resistance $R_e$ of a forward biased p-n junction. This resistance, $R_e$, a function of the current I, is given by $$R_e = KT/qI = 1/40I \text{ (at room temperature)} \quad (2)$$

Thus for a range of I from $10^{-5}$ to $10^{-3}$ amperes $R_e$ would range from 2500 to 25 ohms.

The exact choice of the shunting resistance R will thus depend upon the following factors. The particular values of $\alpha_1$ and $\alpha_2$ and the value of current $I_1$ at which it is desired to have the break in the characteristic occur. In practice values of R have been used in the range from about 50 ohms to as high as 10,000 ohms.

In operation of the device of Fig. 10, when the voltage between the emitter and collector contacts exceeds a critical value, $V_{c1}$, the emitter efficiency increases to a level where the over-all current multiplication ratio of the section exceeds unity and it enters a low impedance region of operation. It remains in this region so long as a sustaining voltage in excess of $V_{S1}$ is maintained between contacts 109 and 110.

A semiconductive structure of this nature can be fabricated by suitable diffusion and alloying techniques. For example, an n-p-n-p structure can be fabricated by diffusing from a vapor state aluminum and antimony from aluminum antimonide into those major faces of an n-type wafer. Aluminum diffuses in silicon more readily than antimony and thus penetrates beyond the antimony to convert a portion of the original n-type body to p-type. However, in the surface regions donor centers of antimony predominate and these regions remain n-type. The resulting structure is a five layer sandwich of n-p-n-p-n conductivity types. One of the n layers can be removed by suitable etching or abrading techniques and the layers can be similarly separated into discrete stepping sections by cutting slots into the outer layers. Contacts can be applied as desired by evaporation or plating of metallic films, by alloying metal bodies or films to the layers, or by soldering techniques.

Each switching section of the stepping device depicted in Fig. 10 is provided with outer regions 102 and 107 which are arranged to concentrate the currents in the section at one end in order to prime the section adjacent that end for operation. This concentration is effected by forming the zones each with a substantial lateral extent and providing contacts thereto over only a restricted portion of their surface in a manner paralleling that suggested for the devices discussed above. Namely, the outer regions 102 and 107 are made of such cross-sectional area in the plane normal to the paper and of such resistivity that a current of the order of one milliampere flowing horizontally or along the lateral direction in these regions produces a potential drop which is large compared to $$\frac{KT}{q}$$

over the length of the region along the paper. These potential drops are in a direction to reduce the forward biases across minority carrier emitting junctions 103 and 106 so that portions remote from ohmic contacts 109 and 110 on the right-hand end of the right-hand end of regions 102 and 106, respectively, tend to cease emitting minority carriers and the major portion of the current through the sections is concentrated between the contacts 109 and 110 and adjacent the left-hand portion or starting region of the next section to the right.

In operation as a counter or stepping device, the unit of Fig. 10 functions in response to actuating potentials which may be applied in the manner discussed above. As in the previously described embodiments, some form of initial priming is employed in order to insure that current flow begins in the desired section. For purposes of simplicity of illustration, this priming means has not been shown in the drawing. It might comprise a potential source corresponding to battery 43 of Fig. 1. The application of a positive potential to lead 25H, sufficient in combination with primary means on section $A_1$ to raise that section above its critical voltage, will switch that section to operation in the region MN of Fig. 11 and concentrate the current in section $A_1$ between terminals 110 and 109. When the voltage applied to lead 25H is reduced below the sustaining voltages, $V_{S1}$ of section $A_1$, that section will stop conducting. If a voltage in excess of the critical voltage of sections $B_1$ and $B_2$ is applied to lead 26H, then one of these sections must then fire. Provided the left-hand end of $B_1$ is sufficiently close to the primary conducting path of section $A_1$, within a few minority carrier diffusion lengths in the common base region 101, and the interval between the termination of conduction through $A_1$ and the application of the critical voltage $V_c$ is sufficiently short, within about a lifetime for minority carriers in the common base region 101, then $B_1$ will break down in preference to $B_2$. This breakdown is due to minority charge carriers injected into the base region of that next section by the previously operated section. Similarly, it can be shown that in each cycle of applied potentials to leads 25H and 26H the current flow will step one section to the right.

The operation of a section, for example section $A_1$, to the exclusion of other sections which are connected to the leads common to that section, is accomplished by employing a potential drop within the region of the device common to each section, the base in Fig. 10, of such magnitude as to maintain the rectifying junctions of those other sections biased in their high impedance state. This drop is realized by so constructing the base region 101 that the resistance within that region between sections connected to common leads is the order of magnitude of the base resistances 112. Thus, when the conducting section is in its current multiplying state and, therefore, draws a large base current, that current flows across the base region and through the contact 111 and resistance 112. In turn, the potential drop due to the base current biases the base region of the operating section positive with respect to ground so that the emitter junction is forward biased. Parallel paths to ground are available for some of this base current along the base region and through the base resistors 112 of other stepping sections. The potentials developed in the base region of the currents in these paths bias the base material under the other sections, such as $A_2$ to a less positive state. Hence, the forward bias on the emitters of those other sections are insufficient to trigger them into their low impedance condition.

The switching unit 120 shown in Fig. 12 corresponds to that of Fig. 10, differing therefrom in that the base resistances 112 of Fig. 10 have been integrated into the semiconductive body as extended lengths 121 of material of the base region 101 individual to each switching section. It is to be noted that Fig. 12 depicts the structure in plane view rather than elevation so that only region 107 of sections $A_1$, $B_1$, $A_2$, and $B_2$ appear. Where the base resistances are formed in the comb-like structure, the thin n layer 102 constituting the emitter can be continuous and suitably spaced, low resistance, ohmic contacts 109 for each section positioned thereon.

Fig. 13 shows another embodiment of a stepping device of the general type shown in Fig. 10. This unit employs a nonrectifying, common connection 122 to the body portion functioning as the base region, and as is the case in the unit of Fig. 12, utilizes the bulk resistance of the body in place of resistor 112 of Fig. 10. As in Fig. 12, Fig. 13 is a plan view of the device and shows only emitter zones 107K, the current path in each stepping section being normal to the plane of the paper.

Figure 14:
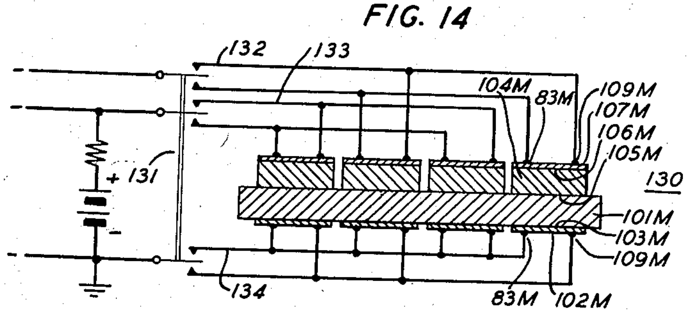

A reversible switching unit 130 utilizing hook collector junction transistor switching sections in the manner of Fig. 10 is shown in Fig. 14. Load resistances 21 through 24, base region contacts 111, and base resistances 112 have been omitted in order to simplify the drawing. However, it is to be understood that these elements or their equivalents, together with appropriate priming means, are included in a complete structure. As in the reversible units of Fig. 8, operation of this device relies upon the use of ohmic contacts to portions on right-hand ends of the sections to advance the conducting path from left to right and contacts on the left-hand ends to advance the path from right to left. The selection of the direction of stepping is effected by switch 131 which in the upper position connects collector leads 132 and 133 and emitter lead 134 to the actuating potential sources and concentrates high currents in the right-hand end of each section, conversely in its lower position it connects leads 135, 136, and 137 connected to contacts on the left-hand send of the sections to the actuating means.

While the preceding discussion has been directed to devices including bodies of semiconductive materials having functioning regions of specific conductivity type, it is to be understood that these regions can be of opposite conductivity type provided operating potentials are suitably reversed. In most of the illustrative embodiments only four stepping sections have been shown, however, in practice many more sections would be employed, usually in a configuration which enabled the operation to continue in a single stepping direction and return to the initially operated section.

Although specific embodiments of this invention have been shown and described, it will be understood that they are but illustrative and that various modifications may be made therein without departing from the scope and spirit of the invention.

What is claimed is:

1. A pulse translator comprising a semiconductive body including a main portion and a succession of discrete portions, each defining with the main portion a separate rectifying junction, each discrete portion and the part of said main portion contiguous thereto forming a separate stepping section, each stepping section being capable of either a high or low impedance state and being included in one of two sets of stepping sections, adjacent stepping sections of the succession being in different sets, alternate stepping sections of the succession being in the same set, a separate electrode means connected to each of the discrete portions of the body at a region thereof asymmetrically positioned with respect to the two most adjacent discrete portions so that when the associated stepping section is in its low impedance state, a selected one of the two adjacent stepping sections is primed, a pair of input terminals to one of which each of the separate electrode means is connected, the separate electrode means of the stepping sections of the same set being connected to the same input terminal and the separate electrode means of the stepping sections of different sets being connected to different input terminals, and electrode means connected to the main portion of the body.

2. A pulse translator according to claim 1 further characterized in that said main portion of the semiconductive body consists of a single zone of one conductivity type and each of said discrete portions consists of a single zone of the opposite conductivity type.

3. A pulse translator according to claim 1 further characterized in that the succession of stepping sections form a closed array.

4. A pulse translator according to claim 1 further characterized in that said main portion consists of a zone of one conductivity type, each of said discrete portions consists of a zone of the opposite conductivity type positioned intermediate between two opposed end regions of the main portion, and distinct electrode means are connected to said two opposed end regions of the body.

5. A pulse translator according to claim 1 further characterized in that a selected stepping section is predisposed to be transferred to the low impedance state in response to the initial pulse of the input pulse train.

References Cited in the file of this patent

UNITED STATES PATENTS

| | | |
|---|---|---|
| 2,624,016 | White | Dec. 30, 1952 |
| 2,655,607 | Reeves | Oct. 13, 1953 |
| 2,672,528 | Shockley | Mar. 16, 1954 |
| 2,790,037 | Shockley | Apr. 23, 1957 |
| 2,800,617 | Pankove | July 23, 1957 |